(12) United States Patent
Luker

(10) Patent No.: US 6,962,431 B1
(45) Date of Patent: Nov. 8, 2005

(54) EXTRUDER MIXER

(75) Inventor: Keith Luker, Patterson, NJ (US)

(73) Assignee: Randcastle Extrusion System, Inc., Cedar Grove, NJ (US)

( * ) Notice: Subject to any disclaimer, the term of this patent is extended or adjusted under 35 U.S.C. 154(b) by 0 days.

(21) Appl. No.: 09/708,225

(22) Filed: Nov. 8, 2000

(51) Int. Cl.⁷ ............................................. B29C 47/64
(52) U.S. Cl. .............................. 366/81; 366/88; 366/90
(58) Field of Search ............................ 366/88, 90, 321, 366/322, 323, 81; 425/208, 209; 416/176, 416/177

(56) References Cited

U.S. PATENT DOCUMENTS

| | | | | |
|---|---|---|---|---|
| 3,184,790 A | * | 5/1965 | Katsuji | |
| 3,486,192 A | * | 12/1969 | Le Roy | |
| 3,787,542 A | * | 1/1974 | Gallagher et al. | |
| 3,788,612 A | * | 1/1974 | Dray | |
| 4,218,146 A | * | 8/1980 | Housz | |
| 4,388,262 A | * | 6/1983 | Brasz et al. | |
| 4,409,164 A | * | 10/1983 | Brasz et al. | |
| 4,425,044 A | * | 1/1984 | Kurtz et al. | |
| 4,733,970 A | * | 3/1988 | Yokana | |
| 4,842,414 A | * | 6/1989 | Dray | |
| 5,114,658 A | * | 5/1992 | Katsaros | |
| 5,130,076 A | * | 7/1992 | Blatz et al. | |
| 5,439,633 A | * | 8/1995 | Durina et al. | |
| 6,206,559 B1 | * | 3/2001 | Kinoshita et al. | |

* cited by examiner

*Primary Examiner*—David Sorkin
(74) *Attorney, Agent, or Firm*—Schnader Harrison Segal & Lewis LLP

(57) ABSTRACT

An extruder mixer and method for mixing plastic materials utilizes an elongated screw having an inlet channel connected to a first cross-axial pump that feeds, at an angle to the screw axis, a subsequent channel, wherein the subsequent channel becomes a further inlet channel connected to at least one subsequent cross-axial pump, and wherein the cross-axial pump is bounded by a flight on at least one side.

19 Claims, 7 Drawing Sheets

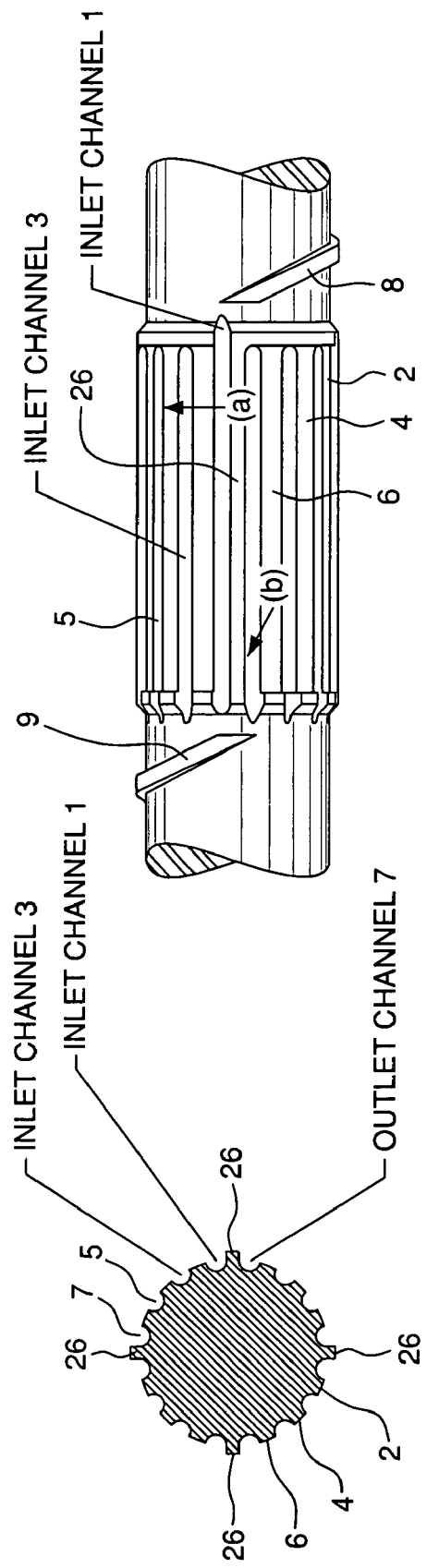

EXTRUDER MIXER

This invention relates to a new extruder mixer and method for mixing plastic or plastifiable materials, utilizing novel effects of elongational stress in the feed material, with improved mixing performance dramatically at all concentrations for the plastic mixture. The invention relates particularly to laboratory-scale mixers, and to their use in designing, building and operating full-scale production mixers using the novel concepts of this invention.

Laboratory extrusion machine builders have traditionally scaled down what the large extruder mixers have available in production. Nevertheless, when these large mixer designs are used in small extruders, they unfortunately do not compound very well.

Laboratory single screw compounders suffer from problems associated with being small. Lower shear rates, lower backflow, and the repercussions of using the same size pellets in laboratory extruders as in large extruders, all reduce the mixing compounder performance of small laboratory mixers.

Shear rates for a ⅝ inch extruder, for example, are roughly one-third that of a 4.5 inch extruder. Many workers regard higher shear rates as important to mixing. Small screws can generate much higher pressures than large extruders because of their small channel depths. Therefore, there is little back-mixing even at high pressure generation. It is a truism that, the better mixed the material enters the extruder, the better mixed is the output. Considering a simple mixture of conventional nominal ⅛ inch pellets mixed with a 1% additive concentrate of the same size and weight, one should consider how many standard ⅛ inch pellets are present at any given time in a ⅝ inch extruder compared with larger machines. For example, a ⅝ inch 24/1 L/D screw contains only 330 pellets or an average of 14 pellets per L/D. Yet a 2 inch screw contains about 905 pellets, a 3.5 about 3,600 pellets, and a 6 inch extruder about 384,000 pellets.

If we imagine a perfectly mixed 1% additive of the same pellet size, the ⅝ inch extruder will contain only 3 pellets of the additive, spread throughout 24 L/Ds of extruder length! The extruder is required to mix one pellet into 8 L/Ds of length. Even a small 2 inch extruder processes a remarkable improvement in the quality of the incoming mixture as it will have 9 additive pellets in each L/D of extruder length. Larger machines obviously have more.

The problem is worse than this, in practice, because the mixture is unlikely to be perfectly mixed. In the foregoing "3 pellet per 8 L/D" example, it is very probable that only 2 or as many as 4 pellets could be in the extruder at one time. Accordingly, there will be times when only 1 pellet might be present. If the hopper mixture were slightly uneven, there might even be a time with no additive pellets in the entire screw—a difficult mixing problem to be sure.

This problem is so unlikely to exist in large extruders that it needs no consideration. The possible use of micro-pellets would seem to avoid these problems but such pellets are expensive, inconvenient, and often require at least one additional processing history. Accordingly, it would be highly advantageous to resolve the problem even with the use of standard or typical pelletized feed stocks.

Most single screw extruders are flood fed, by filling the hopper and the screw channel to its limit. However, compression of solids is not necessarily consistent with good mixing. In a compressive extruder where equal amounts of two types of pellets, A and B, are to be mixed in the extruder, on entering the screw, it is extremely unlikely that the mix will be perfect, i.e. A-B-A-B-A-B-A-B etc. Some inconsistent sequence will likely occur such as A-A-A-A-B-B-B-B. Compression of this sequence at high pressure often results in very sturdy "A" and "B" material where each agglomeration has to be broken up, i.e., mixed by dispersion, and then mixed intimately with each other, i.e., by distribution. This is inherently counterproductive to good mixing.

The creation of the vertically oriented extruder improved the laboratory extruder itself, with its natural advantages of better feeding and screw strength, and dramatic increase of the L/D ratio. This is possible because the vertical screw is in tension rather than compression. This eliminates the buckling forces (caused by pressure at the tips of other screws) that otherwise destroy long small screws.

Length is an important attribute of a screw for many reasons. Length presents the opportunity to begin the melting process without compression.

BACKGROUND OF THE INVENTION

Of the many mixing elements that have been made, three fluted mixers are of particular interest. These are the mixers of G. LeRoy U.S. Pat. No. 3,486,192, R. B. Gregory and L. F. Street U.S. Pat. No. 3,411,179, and R. G. Dray, U.S. Pat. No. 3,788,612. These mixers are often claimed to have dispersive mixing properties because the barrier clearance within the inner wall of the outer cylinder of the extruder is so small that the material is subjected to a high shear rate, the corresponding shear stress then being large enough to break down particles in the polymer melt. An important assumption in this prior art analysis is that the mixer is filled with plasticized material under compression. For example, in R. G. Dray U.S. Pat. No. 3,788,612, since the material is described as plasticized and forced through increasing resistance through the mixing element, the intention of the patent is to force material, under compression, through this mixing element. The foregoing will be seen to be contrary to the substance of this invention.

SUMMARY OF THE INVENTION

In this invention the mixer is preferably an integral part of the melting zone of the screw. Therefore, the mix viscosity at the mixer is much higher than otherwise. This allows the creation of a tensile stress on the mixture, and enables novel elongational dispersion of the mixture in the melting zone.

In order to mix at the optimum level, only a minimum amount of pressure is applied to deliver the feed material to the inlet channel of the mixer. Once the incoming plastic material enters the inlet channel, it meets one or a succession of cross-axial pumping members preferably having substantial clearance with the outer shell of the extruder, and each one takes on a cross-axial pumping function. When the cross-axial pumping, effective at an angle to the extruder axis, exceeds the inlet flow, the pumping function causes the inlet channel to become partially emptied. The plastic material that approaches each cross-axial pump is then stressed in elongation rather than compression, and remarkable mixing dispersion takes place. As the material then moves over each cross-axial pump, it is reoriented in a planar shear field. These successive reorientations take place in the absence of a worm flight as typically exists to generate pressure between two successive mixing elements. This effect may be further augmented by starve feeding of the plastic feed into the extruder, which may be controlled or assisted by screw design. Starve feeding adds a great deal of flexibility to the process and to optimization of the mixing process.

To encourage or reduce the amount of remixing, for example, additional feed rate to fill the end of the inlet channel with plastic material can be used as a control.

BRIEF DESCRIPTION OF THE DRAWINGS

This invention will further be described in detail in the drawings, which are intended to be illustrative but are not intended to define or limit the scope of the invention, which is defined in the appended claims.

FIGS. 5(a) and 5(b) represent a further embodiment in accordance with this invention.

FIG. 6 comprises FIGS. 6(a) and 6(b) in accordance with this invention, showing a multiplicity of channels outlet channels and cross-axial pumps as will further be described in detail hereinafter. FIG. 6(a) is a sectional view taken through the mixer of FIG. 6(b), along the lines and arrows 6a—6a.

DETAILED DESCRIPTION OF THE INVENTION

The current invention optimizes the mixing that takes place in a limited axial space along the extruder screw by providing multiple passes of plastic material drawn through a plurality of elongational mixing zones. This gives much greater latitude in design and achieves much better mixing results than heretofore suggested, as will further appear hereinafter.

Figure 1A:
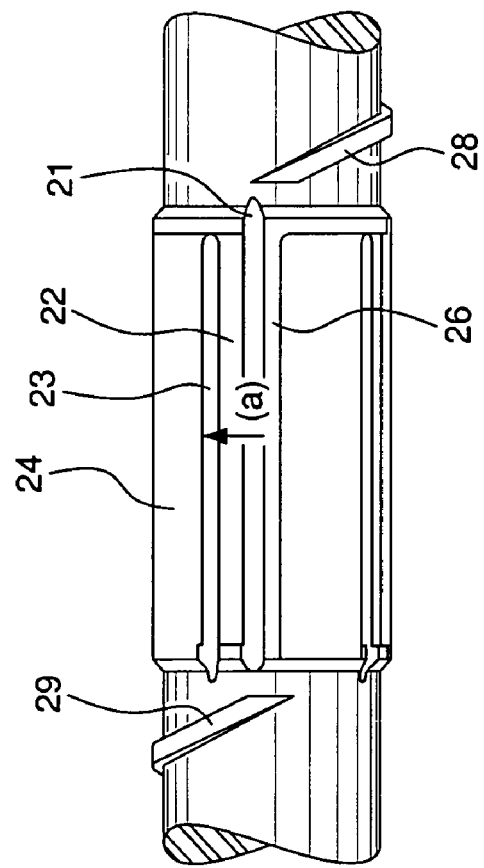
FIGS. 1(a) and 1(b) are views in showing a mixer in accordance with this invention.
Figure 1B:
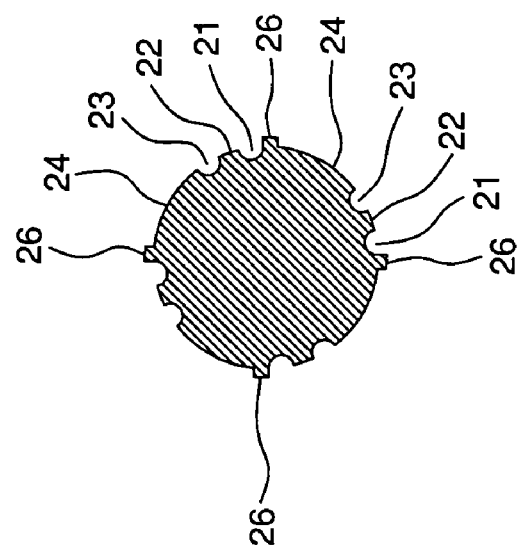

In a mixer of this invention, the plastic material flow is shown schematically in FIGS. 1(a) and 1(b) of the drawings. First inlet channel 21 is starved (partially empty) conveying material to first cross-axial pump 22. As the flow accelerates into cross-axial pump 22, an important improvement in mixing is created. Cross-axial pump 22 reorients the material in planar shear while pumping into the second channel inlet 23. Second channel inlet, also starved, conveys material to the inlet to subsequent cross-axial pump 24. Cross-axial pump 24 then functions as an output channel.

Figure 2A:
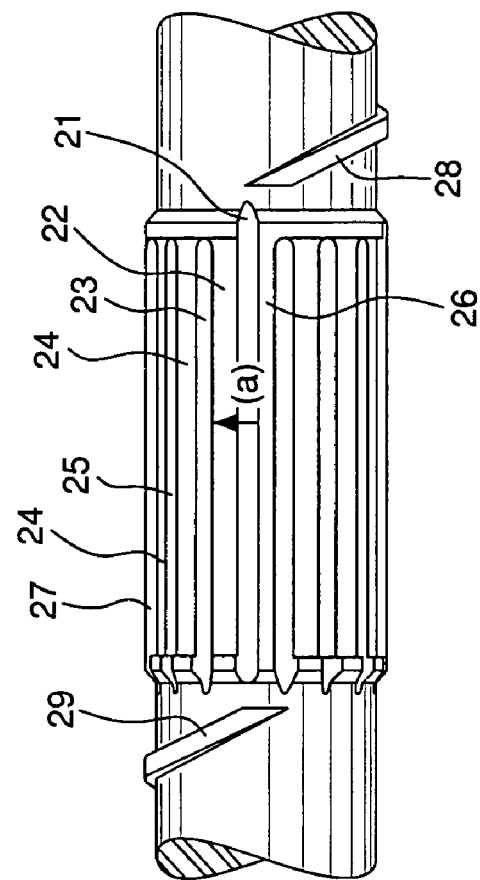
FIGS. 2(a) and 2(b) are views in side elevation showing a mixer in accordance with this invention.
Figure 2B:
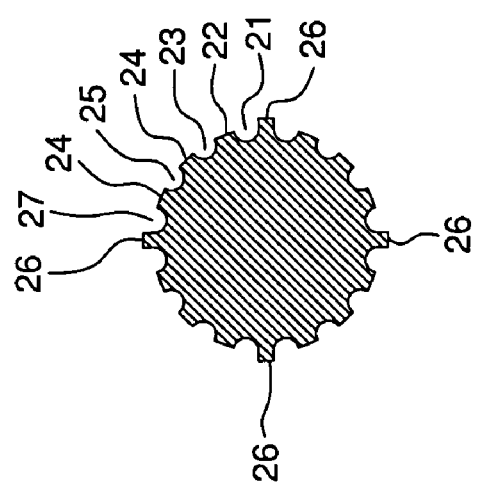

FIG. 2(b) shows the four flights 26 that tend to induce a certain amount of downstream flow in the various adjacent inlet channels.

First inlet channel 21 is starved (partially empty) conveying material to first cross-axial pump 22. As the flow accelerates into cross-axial pump 22, an important improvement in mixing is created. Cross-axial pump 22 reorients the material in planar shear while pumping into second channel inlet 23. Second channel inlet 23, also starved, conveys material to the inlet to subsequent cross-axial pump 24 where subsequent acceleration and further mixing improvements take place. Subsequent cross-axial pump 24 further reorients the material in planar shear while pumping material to subsequent inlet channel 25. After subsequent mixing and pumping, material is delivered to final output channel 27. The cross-axial pumps 22 and 24 pump the mixture at an angle such as (a) in FIG. 2(a) and draw off the material from the inlet channels 21, 23, 25 until the supply is exhausted.

Figure 4A:
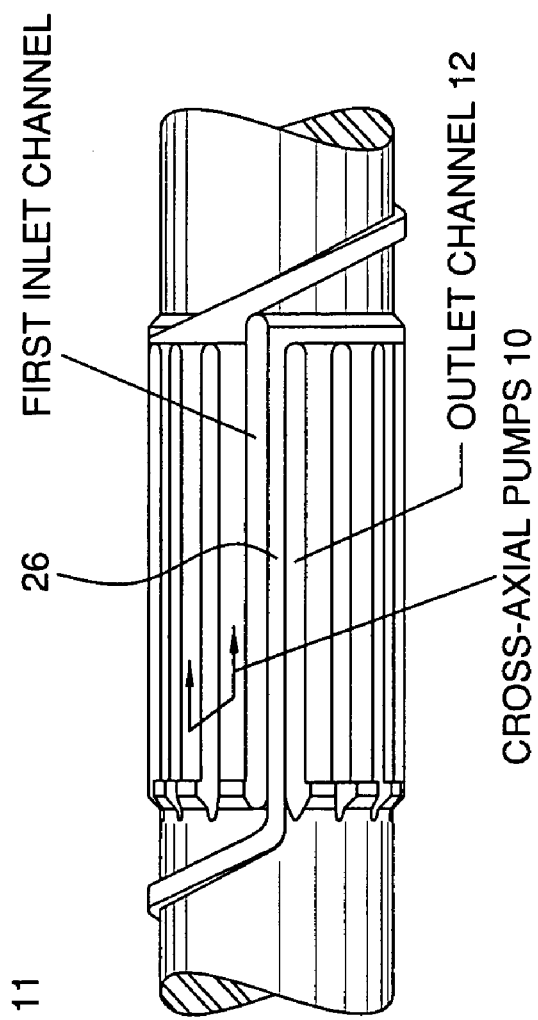
FIGS. 4(a) and 4(b) are fragmentary side sectional views, representing a preferred embodiment of this invention, as will further be described hereinafter.
Figure 4B:
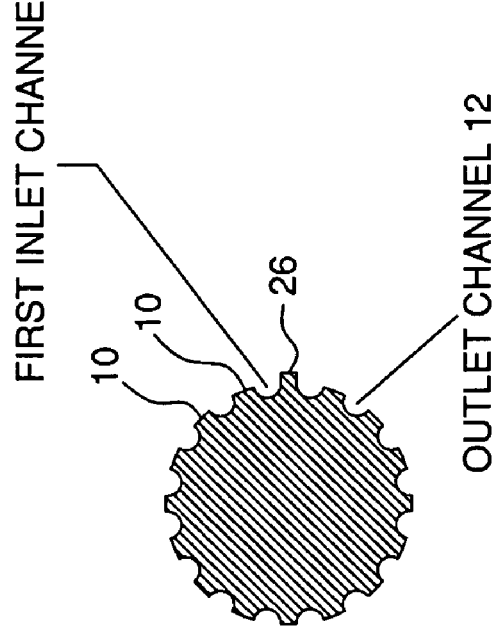

In the preferred embodiment shown in FIG. 4, the screw (which is driven in rotation by any suitable power source, not shown) has fifteen sections of inlet channels 11, cross-axially acting pumps and one outlet channel 12, and therefore provides exceptional mixing. Further flight 26 is shown to become a connected inlet and outlet flight that both guides material to first inlet channel 11 and from outlet channel 12.

Previous mixers have attempted to force material from one channel, over a barrier, and into a flight or channel such as in LeRoy U.S. Pat. No. 3,486,192 and Dray U.S. Pat. No. 3,788,612. Dray forced material from channel to flight in an uncontrolled manner, as shown in Dray U.S. Pat. No. 3,788,612. By forcing, the flow fields were compressive rather than extensional.

The invention of FIGS. 2 and 4 achieves a series of mixing stages, in extensional plastic material flow fields, in a short axial length compared to the length of the extruder screw. Extension of the plastic material is achieved by cross-axial drawing of the mixture from one channel directly to another channel at reduced pressure and preferably by operation in which the channels are in a partially empty mode. This latter mode may be achieved by starve feeding the inlet to the mixer, preferably by limiting the input amount by combined use of a starve feeder (such a variable speed volumetric feeder) or, for example, by limiting the amount of material received by the mixer as a matter of screw design prior to the mixer.

It has heretofore been suggested, contrary to this invention, to provide possible means to reduce the amount of remixing. There is no mechanism suggested, to the best of my knowledge, that causes substantially all of the material to be remixed, as in this invention. Indeed, it has been indicated that additional feed rate to fill the end of the inlet channel would prevent remixing.

FIG. 5 of the drawings, like FIGS. 2(a) and 2(b), shows disconnected inlet and outlet flights 8, 9 and also shows a multiplicity of inlet channels 1, 3, 5 and a multiplicity of outlet channels 7, with intervening cross-axial pumps 2, 4, 6 pumping in angular directions such as (a), (b), which are important features in accordance with this invention.

Figure 6B:
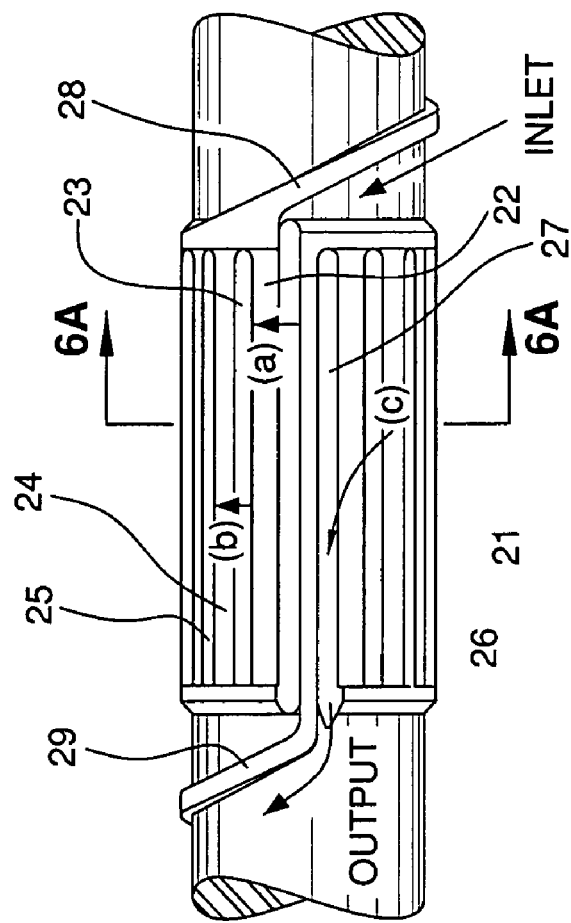
Figure 6A:
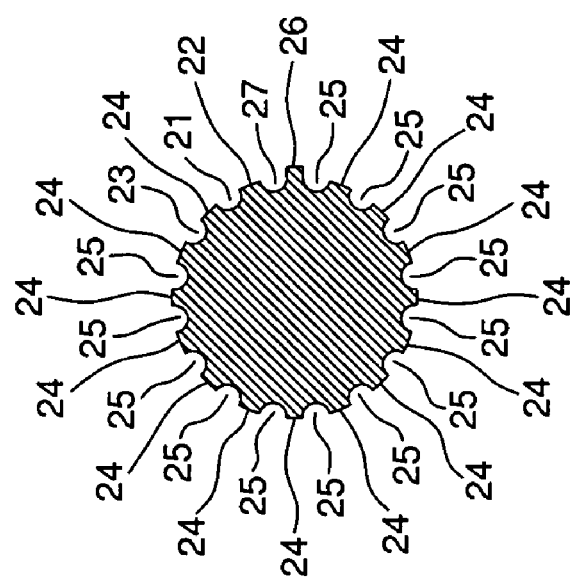

FIGS. 6(a) and 6(b) show another embodiment of this invention comprising a multiplicity of these inlet and cross-axial pumping channels, working in combination with connected output flight 26 and where first cross-axial pump 22, second inlet channel 23, subsequent cross-axial pumps 24 and subsequent inlet channels 25 are bounded by a flight on two sides. This embodiment substantially prevents downstream flow from entering the mixer. The first inlet channel bears the number 21, the first cross-axial pump 22, the second inlet channel 23, the subsequent cross-axial pump 24, the subsequent inlet channel 25. The arrows (a) and (b) indicate cross-axial pumping, and arrow (c) designates downstream flow. The flight in the mixer section is identified as 26, while the final output channel is identified by the number 27. The input and output portions of flight 26 are identified as 28 and 29.

Figures 3A, 3B:
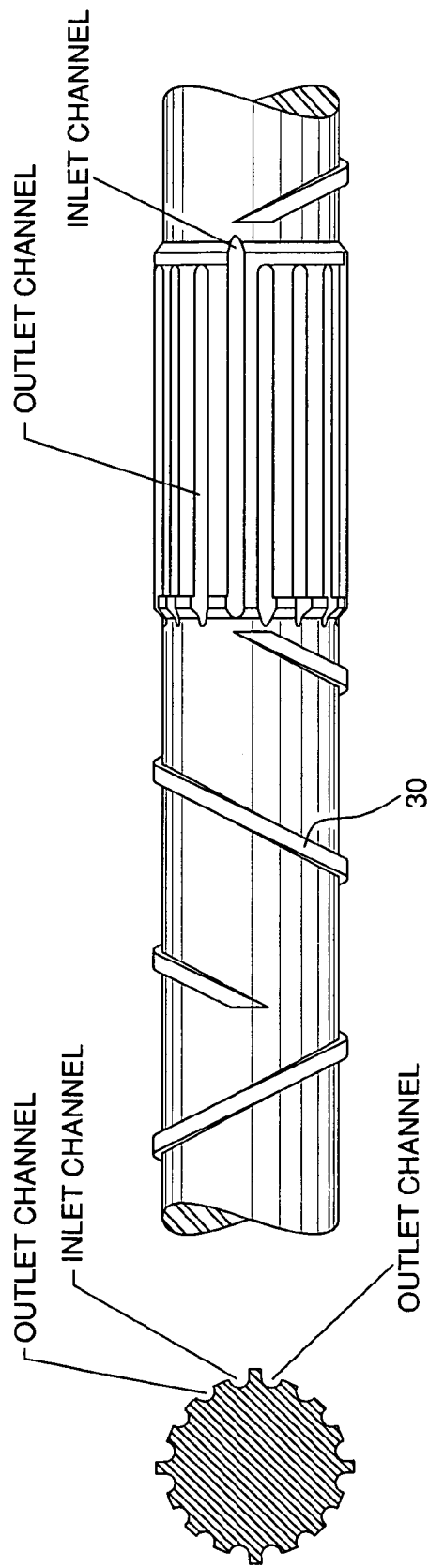
FIGS. 3(a) and 3(b) are side and sectional views showing a modified form of the invention.

FIGS. 3(a) and 3(b) show the use of a reverse screw flight 30 in a mixer otherwise similar to FIGS. 2(a) and 2(b). In FIGS. 3(a) and 3(b) the plastic material flow is from right to left, with the reverse flight urging the plastic material toward the right, into the outlet channels of the mixer for the purpose of control. It is preferred to limit the reverse effect to avoid completely filling the mixer, because the mixer would then become compressive and lose the benefits of this invention.

Figure 7A:
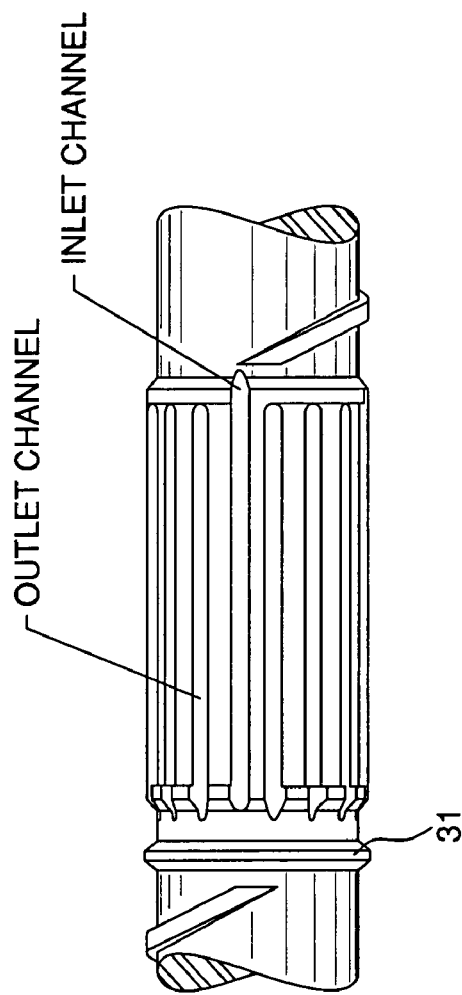
FIGS. 7(a) and 7(b) show a further embodiment of the invention.
Figure 7B:
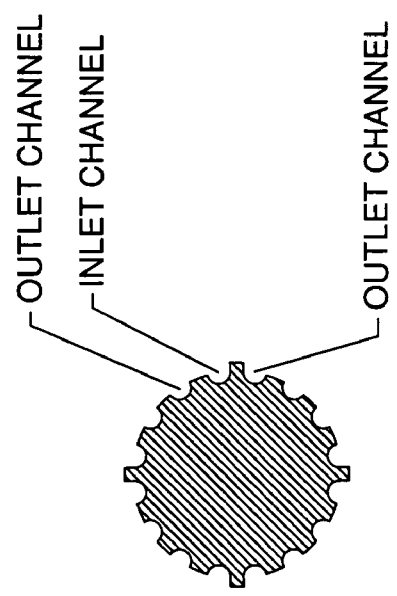

Referring to FIGS. 7(a) and 7(b), this embodiment includes a blister ring 31 to urge the plastic material toward the right, countercurrently. The blister ring 31 is a non-axial pumping ring which is designed as a narrow ring to control the mixer to be not quite filled, because it would then become compressive.

As an alternative, the channel depth could be reduced downstream of the mixer to decrease its pumping capacity, causing some plastic material to back up into the empty mixing channels.

It has been suggested that notches in the flight will permit material to flow through the flight into the inlet channel. Thus, the concept of notches permits material to flow either into one of the inlet channels or continued to be pumped out a discharge channel. This has serious drawbacks that the present invention overcomes.

A flight such as 26 in FIG. 6(b) has a small radial clearance from the extruder housing. A channel according to this invention has a large radial clearance from the extruder housing.

The flight 26 restricts flow for the purpose of promoting flow down and along the outlet channel. It is preferred for the flight 26 not to be a notched flight. A notched flight primarily promotes material into an inlet channel through the notches. When such flow exceeds the pumping capacity of the cross-axial pumps 22, 24, for example, the mixer flow will become undesirably compressive. A flight such as 26 in this invention includes variations in design sufficient to maintain elongational, non-compressive, flow in the mixer.

Although this invention has been described with reference to specific embodiments thereof, it will be appreciated that many variations may be made in the specific design of the extruder and its mixing section, including variations of the numbers and arrangements of inlet channels, cross-axial pumps, the number of inlet channels and cross-axial pumps, and the number and arrangement of subsequent outlet channels. It will further be appreciated that the flight at the input and the exit ends of the mixing section can either be connected to or disconnected from the channels. Further, although it has been indicated as preferred to utilize a separate starve feeding mechanism, the invention is fully capable of operating with benefit and advantage in the absence of any such controlling mechanism. The dimensions of various channels may be specially designed to be similar or different from each other, where plural channels are utilized, and the dimensions of the first and subsequent cross-axial pumps can differ from each other. Although the channels may be oriented parallel to the screw axis, they may be angled as well. Further, some of the channels may be non-inlet channels and bounded by a flight on one side or more than one side. Many other variations may be made, as will readily become apparent to those skilled in the art.

What is claimed is:

1. An extruder mixer for plastified flowable material comprising:
    an elongated rotatable screw having an elongational mixing zone adapted to mix material flowing therethrough, the mixing zone having:
    a substantially axially disposed inlet channel in fluid communication with a substantially axially disposed outlet channel;
    both the inlet channel and the outlet channel being bounded on one side by a substantially axially disposed blocking wall which substantially prevents material from flowing therepast;
    a substantially axially disposed first intermediate channel disposed between the inlet and the outlet channels and in fluid communication therewith;
    a substantially axially disposed first cross-axial pump disposed between the inlet channel and the first intermediate channel, the first pump drawing the material from the inlet channel into the first intermediate channel; and
    a substantially axially disposed second cross-axial pump disposed between the first intermediate channel and the outlet channel, the second pump drawing the material out of the first intermediate channel into the outlet channel to deliver the plastified material out of the mixing zone.

2. The apparatus of claim 1, wherein an upstream feeder is flowingly connected to cause and to control input feed of the mixable materials.

3. The extruder mixer according to claim 1, wherein the inlet channel is open at a downstream end for allowing material to flow directly out of the inlet channel to outside of the mixing zone.

4. The extruder mixer according to claim 1, wherein the dimensions of the channels are the same.

5. The extruder mixer according to claim 1, wherein the dimensions of the channels are different from each other.

6. The extruder mixer according to claim 1, further comprising:
    at least one pair of an additional substantially axially disposed intermediate channel and cross-axial pump disposed after the second pump and in fluid communication therewith, the additional pump being disposed after the additional channel and drawing material from the additional channel into the succeeding channel and pump pair.

7. The extruder mixer according to claim 6, wherein at least one of the at least one additional channel is open at an upstream end for allowing material to flow directly into the at least one additional channel from outside of the mixing zone.

8. The extruder mixer according to claim 6, wherein at least one of the at least one additional channel is open at a downstream end for allowing material to flow directly out of the at least one additional channel to outside of the mixing zone.

9. The extruder mixer according to claim 1, wherein the inlet channel blocking wall and the outlet channel blocking wall are the same.

10. The extruder mixer according to claim 1, further comprising a screw channel disposed on the rotatable screw before the input channel of the mixing zone and flowingly connected to control the flow rate of the material into the mixing zone.

11. The extruder mixer according to claim 1, further comprising an output flight flowingly connected to at least one of the blocking walls.

12. The extruder mixer according to claim 1, wherein the dimensions of the cross-axial pumps are the same.

13. The extruder mixer according to claim 1, wherein the dimensions of the cross-axial pumps are different from each other.

14. The extruder mixer according to claim 1, wherein the channels are oriented substantially parallel to the longitudinal axis of the screw.

15. The extruder mixer according to claim 1, further comprising a resistance device disposed on the screw after the mixing zone for forcing the plastic material back into said the output channel.

16. The extruder mixer according to claim 1, wherein the intermediate channel is bounded by a flight on an upstream end for preventing material from flowing directly into the intermediate channel from outside of the mixing zone.

17. The extruder mixer according to claim 1, wherein the outlet channel is bounded by a flight on an upstream end for preventing material from flowing directly into the outlet channel from outside of the mixing zone.

18. The extruder mixer according to claim 1, wherein the intermediate channel is open at an upstream end for allowing material to flow directly into the intermediate channel from outside of the mixing zone.

19. The extruder mixer according to claim 1, wherein the intermediate channel is open at a downstream end for allowing material to flow directly out of the intermediate channel to outside of the mixing zone.

* * * * *